United States Patent
Wolf

[11] 3,869,392
[45] Mar. 4, 1975

[54] FILTER CARTRIDGE
[75] Inventor: Max Wolf, Stuttgart, Germany
[73] Assignee: Knecht Filterwerke Gesellschaft mit beschraenkter Haftung, Stuttgart, Germany
[22] Filed: Jan. 29, 1973
[21] Appl. No.: 327,452

[30] Foreign Application Priority Data
Feb. 3, 1972 Germany.......................... 7203991

[52] U.S. Cl................ 210/493, 210/495, 55/502, 55/521, 55/DIG. 31
[51] Int. Cl............................................ B01d 27/06
[58] Field of Search.................. 210/493, 495, 484; 55/DIG. 31, 501, 502, 521, 489

[56] References Cited
UNITED STATES PATENTS
3,389,031  6/1968  Rosaen et al...................... 210/493
3,747,772  7/1973  Brown........................... 55/DIG. 31

Primary Examiner—Charles N. Hart
Assistant Examiner—F. F. Calvetti
Attorney, Agent, or Firm—Murray Schaffer

[57] ABSTRACT

Cartridge for internal combustion engines, in which the filter body is formed from a strip of filter material which is pleated or folded in a zig-zag manner to have its folds relatively close to one another in a dense arrangement. The body is carried by a plastic frame which is provided with a clamping flange in which the edges of the filter paper are embedded during the molding of the frame.

2 Claims, 1 Drawing Figure

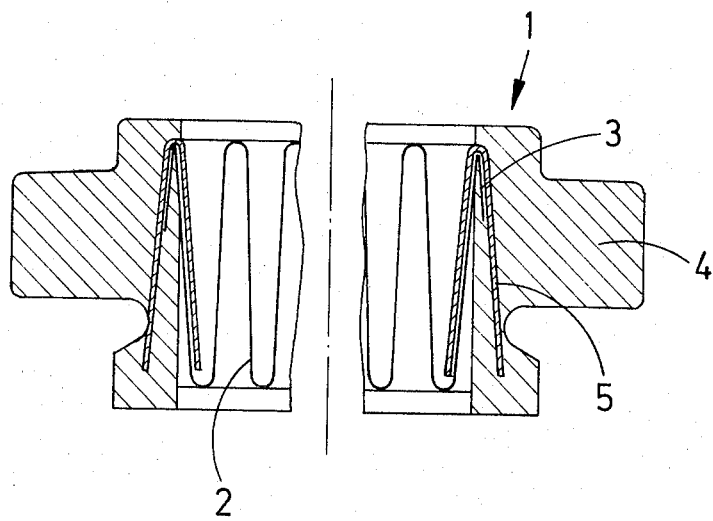

FILTER CARTRIDGE

The present invention relates to a flat or planar filter insert or cartridge for internal combustion engines, in which the filter body is formed from a strip of filter material which is pleated or folded in a zig-zag manner to have its folds relatively close to one another in a dense arrangement. The body is carried by a plastic frame which is provided with a clamping flange in which the edges of the filter paper are embedded during the molding of the frame.

The housings of these filters are generally of a partite nature and are provided with locking elements or latches which force the portions together when closed. When filter cartridges of the type described above are inserted in the housing, and particularly, when such filter cartridges are of a large size, the locking elements are likely to bend and distort the edges of the cartridge, particularly along its broad side. This occurs because of the lateral pressure against the cartridge, since the cartridge does not have enough strength or stiffness. As a result the filter cartridge and particularly the filter body is so distorted, that it may leak at several points. Such leakage, of course, should be avoided.

It is the object of the present invention to overcome this disadvantages and to provide a filter of the type described which does not have the above disadvantage.

According to the present invention the disadvantages of the prior art are overcome in providing metal reinforcing strips on the end sides of the folds which are attached to the frame and by embedding the end fold and metal strips in the fram when the frame is itself molded.

In the accompanying drawing an embodiment of the invention is shown. The drawing is a longitudinal section through the filter cartridge.

As seen in the drawing the filter, generally depicted by the numeral 1, comprises a body 2 formed a suitable filter media. The body 2 is made from a strip or sheet of the filter media which is pleated or folded in a zig-zag pattern wherein the adjacent folds are closely packed to form a very dense cartridge. The media may be conventional filter paper, or a mat of accreted fibers, and may be impregnated to provide it with certain characteristics of strength, moisture repellancy or absorption as desired, as well as with means for reacting with the fluid media filtered. The edges 3 of the filter body are embedded in a plastic frame 4 and reinforced with a metal strip 5.

The frame is so formed that a small portion along its inner periphery is made to form a clamping flange which holds the end of the filter and the reinforcing member.

The strip may be formed of any suitable metal, taking into account the media to be filtered. The strip is preferably bent into a V-shape to provide two legs of a length equal to that of the fold of the filter body so that it is sufficient long to cover the outermost fold of the body.

The filter is assembled as a unitary structure by molding the frame 4 in situ about the end fold of the filter body while the reinforcing member 5 is in position. Thus the end folds of the body become embedded securely and certainly within the plastic frame without the possibility of damage to it.

The frame may be made from any suitable and conventional plastic material used for production of existing filters.

Various modifications embodiments will of course be evident to those skilled in this art. Accordingly, the foregoing disclosure is to be taken as illustrative only, and not limiting of the scope of the present invention.

What is claimed:

1. A filter cartridge comprising a filter body consisting of a sheet of impregnated fibrous filter material pleated in a dense, zig-zag arrangement of uniform parallel folds forming a self-supporting rectangular body terminating in a complete fold at each of its transverse ends and an edge at each of its longitudinal ends, a metal reinforcing strip bent along its length to form a V-shaped member having two legs of a width equal to that of said fold and of a length substantially equal to that of said transverse end folds, said metal strip being located solely over each of said transverse end folds, a frame consisting of a flexible molded plastic material surrounding the perimeter of said filter body, said frame extending over the longitudinal edges and embedding same therein and having a groove for receiving one leg of each of said transverse end folds and said associated metal strip together and embedding the same therein, the other leg of said end fold and said metal strip extending into the interior of said frame.

2. A filter cartridge according to claim 1, wherein the frame comprises a plastic material molded in situ about the end fold said metal strip.

* * * * *